US008665465B2

United States Patent
Takahashi (10) Patent No.: US 8,665,465 B2
(45) Date of Patent: Mar. 4, 2014

(54) IMAGE PROCESSING APPARATUS, PROCESSING METHOD PERFORMED IN IMAGE PROCESSING APPARATUS, AND COMPUTER PROGRAM PRODUCT

(75) Inventor: Rina Takahashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/608,282

(22) Filed: Sep. 10, 2012

(65) Prior Publication Data

US 2013/0070282 A1 Mar. 21, 2013

(30) Foreign Application Priority Data

Sep. 15, 2011 (JP) ................................. 2011-201302

(51) Int. Cl.
*G06K 15/00* (2006.01)
(52) U.S. Cl.
USPC .......................... 358/1.14; 358/1.13; 358/1.15
(58) Field of Classification Search
USPC .............. 358/1.1, 1.13, 1.14, 1.15, 1.16, 501, 358/505, 401, 443, 448; 399/79, 80, 81
See application file for complete search history.

(56) References Cited

U.S. PATENT DOCUMENTS

2005/0135829 A1 6/2005 Miyazaki

FOREIGN PATENT DOCUMENTS

| JP | 2000-076083 | 3/2000 |
| JP | 2001-111743 | 4/2001 |
| JP | 2005-161677 | 6/2005 |

*Primary Examiner* — Vu B Hang
(74) *Attorney, Agent, or Firm* — Harness, Dickey & Pierce, P.L.C.

(57) ABSTRACT

When, during execution of a job, an operation/display control unit detects a job execution stop command given by an operation display unit, and receives a command to display a list of jobs in an execution standby state from the operation display unit, the operation/display control unit displays a job list screen on the operation display unit, without accepting an input of authentication information from the operation display unit and without passing authentication conducted by an authentication control unit. When the operation/display control unit accepts a command to delete a job in the execution standby state from the operation display unit, the operation/display control unit accepts an input of authentication information, and a job control unit executes deletion of the job in the execution standby state or change of setting of the job in the execution standby state after successfully passing authentication with the authentication control unit using the authentication information.

6 Claims, 5 Drawing Sheets

IMAGE PROCESSING APPARATUS, PROCESSING METHOD PERFORMED IN IMAGE PROCESSING APPARATUS, AND COMPUTER PROGRAM PRODUCT

CROSS-REFERENCE TO RELATED APPLICATIONS

The present application claims priority to and incorporates by reference the entire contents of Japanese Patent Application No. 2011-201302 filed in Japan on Sep. 15, 2011.

BACKGROUND OF THE INVENTION

1. Field of the Invention

This invention relates to an image processing apparatus, a processing method performed in the image processing apparatus, and a computer program product.

2. Description of the Related Art

In recent years, image processing apparatuses including a facsimile apparatus, an image reading apparatus, a print apparatus, a copy apparatus, and a multi-function apparatus having functions of these apparatuses are required to save paper and are more strongly demanded by users to prevent print errors.

In addition, the image processing apparatus is also required to improve security, and it is necessary to set applications that are allowed to be used by users and also set applications that are prohibited from being used by users, and it is necessary to prohibit users from manipulating queued job made by other people.

The above application means functions for executing facsimile communication, network communication (including communication using the Internet), image reading (scanner), printing (print), or copying (copy).

In the past, when one queued job is selected, and a command is input to change or delete setting of the selected queued job, a user ID registered for the queued job is displayed, and a user authentication screen is displayed to prompt input of a password corresponding to the user ID.

Then, when a password given to the user authentication screen is determined to match the password corresponding to the user ID registered in the queued job, the image processing apparatus enables deletion or change of setting of the queued job. Such image processing apparatus is disclosed in, for example, Japanese Patent Application Laid-open No. 2001-111743.

In the conventional apparatus described above, however, the queued job which is to be deleted or of which setting is to be changed may be finished before the user authentication is successfully made.

Accordingly, for example, Japanese Patent Application Laid-open No. 2005-161677 discloses an image processing apparatus as follows.

When a clear/stop key is pressed down during copy/print execution of an image forming job after login, the print is temporarily stopped, and an authentication screen is displayed.

Subsequently, when a user name and a password which are input to the authentication screen are determined to respectively match the user ID and the password registered for the image forming job, the authentication screen is closed, and a copy operation halting screen is displayed.

When a cancel key displayed in the copy operation halting screen is determined to be pressed down, the image processing apparatus stops copy/print of the image forming job after login.

However, the above technique for cancelling copy/print of the image forming job after login during copy/print execution of the image forming job does not enable operation of changing or deletion of setting of queued jobs other than those being executed.

If an application usage permission can be set for each application such as copy, print, and scanner, the user is unable to stop a job of an application being executed unless the user has an application usage permission of the application being displayed (being executed) even if the user has been successfully authenticated to use the image processing apparatus.

Furthermore, if a setting has been made to temporarily stop all the queued jobs and the job in the currently-executed state, when a command is input to stop a job in a currently-executed state, all jobs are temporarily stopped as soon as an authentication screen is displayed. However, if the user does not have the application usage permission of the application being executed, the stop operation is rejected, and all the jobs are resumed.

Therefore, there is a problem in that, during execution of an application of which application usage permission is not given to the user, it is impossible to perform operation of changing or deletion of setting of other queued jobs.

Therefore, there is a need for an image processing apparatus and a processing method performed therein that are capable of performing such operation that, when a user successfully passed authentication and is allowed to manipulate jobs but there are not only a job in the currently-executed state but also a job in an execution standby state, the user can manipulate the job in the execution standby state without passing authentication of the job in the currently-executed state.

SUMMARY OF THE INVENTION

According to an embodiment, there is provided an image processing apparatus that includes a job execution unit that executes a job related to image processing; an authentication unit that, when authentication using authentication information which is input by a user is successfully passed, permits a user to operate a job to be executed by the job execution unit; a job execution stop command detection unit that detects a job execution stop command given by the user; a first command accepting unit that, when the job execution stop command detection unit detects the job execution stop command, accepts from the user an operation command for a job in the currently-executed state and a list display command to display a list of jobs in the execution standby state, without accepting an input of authentication information from the user and without passing the authentication conducted by the authentication unit; a second command accepting unit that, when the first command accepting unit accepts the list display command, causes a display unit to display a list screen in which the jobs in the execution standby state are displayed as a list, and accepts from the user a selection of a job from the jobs displayed on the list screen and an operation command for the selected job; an authentication information accepting unit that, when the first command accepting unit accepts the operation command for the job in the currently-executed state, accepts from the user the input of the authentication information, and that, even when the second command accepting unit accepts the operation command for the job in the execution standby state, also accepts from the user the input of the authentication information; and an operation execution unit that, when, in response to the operation command for the job in the currently-executed state accepted by the first command accepting unit, the authentication unit successfully passes the authentication using the authentication information accepted by the authentication information accepting unit and then the authentication unit permits operation for the job in the currently-executed state, executes the operation for the job in the currently-executed state, and when, in response to the selection of the job and the operation command for the selected job accepted by the second command accepting unit, the authentication unit successfully passes the authentication using the authentication information accepted by the authentication information accepting unit and then the authentication unit permits operation for the selected job in the execution standby state, executes the operation for the selected job in the currently-executed state.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment for carrying out the invention will be explained in detail with reference to the accompanying drawings.

Figure 1:
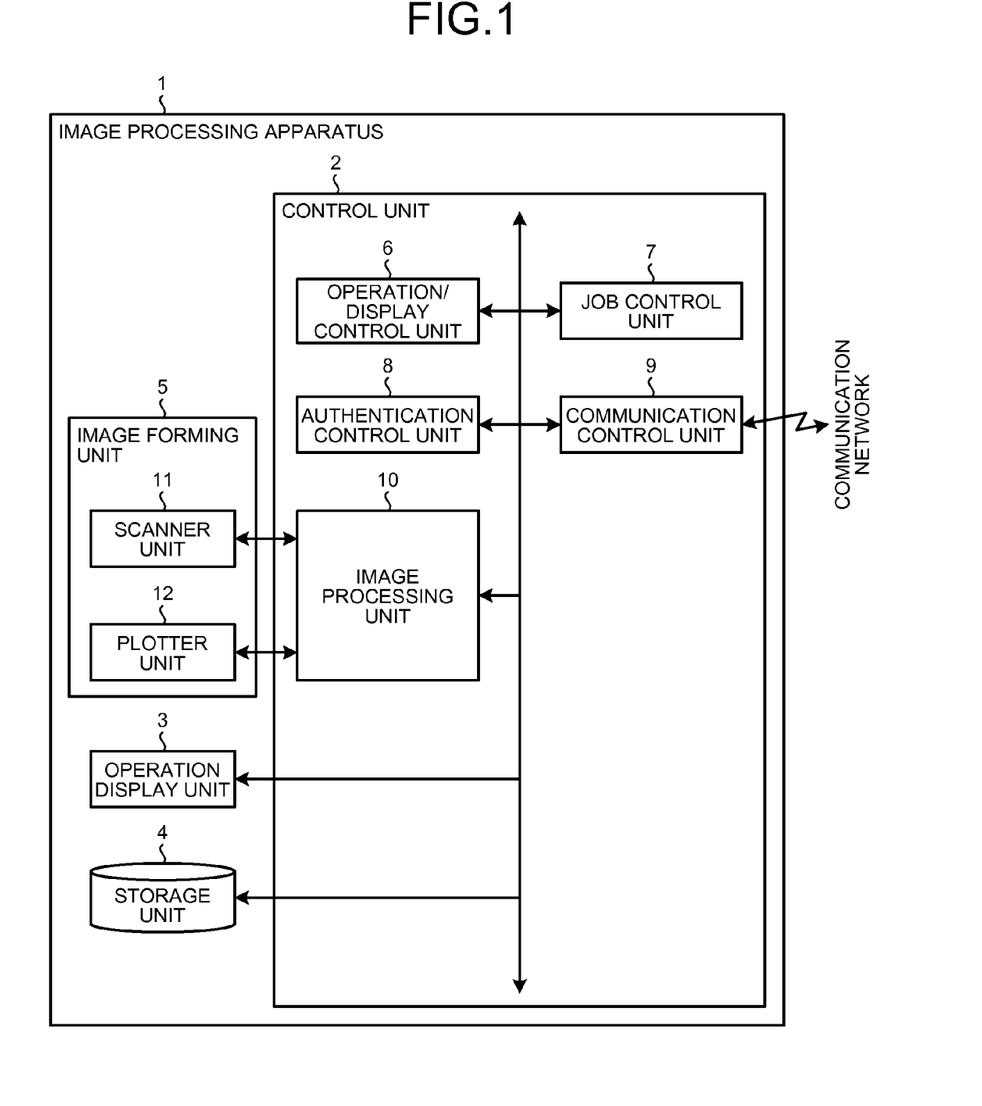
FIG. 1 is a block diagram illustrating a functional configuration of an image processing apparatus which is an embodiment of the invention.

FIG. 1 is a block diagram illustrating a functional configuration of an image processing apparatus 1 according to an embodiment of the invention.

The image processing apparatus 1 is a multi-function peripheral having functions related to image processing such as facsimile communication, image reading, printing, and copying. The image processing apparatus 1 includes a control unit 2 that centrally controls the entire image processing apparatus 1. The image processing apparatus 1 is also referred to as an image forming apparatus.

In addition, the image processing apparatus 1 includes: an image forming unit 5; a scanner unit (image reading unit) 11 that read an image of a document and inputting the image data thereof; a plotter unit 12 that prints data received via facsimile communication or network communication or image data read by the scanner unit 11; an operation display unit 3 serving as display unit with which a user inputs various kinds of commands to the image processing apparatus 1 and on which various kinds of screens are displayed to the user; and a storage unit 4 that stores therein various kinds of data including image data.

The control unit 2 includes a CPU that controls the entire image processing apparatus 1, a ROM that stores therein a computer program (also referred to as "firmware") executed by the CPU, and a RAM used as a work region when the CPU executes the program of the ROM and stores therein various kinds of information including image data.

The program includes: a job execution procedure (a process in a job execution step) of executing a job related to image processing including data communication, image reading, printing, copying, or the like; and an authentication procedure (an authentication step) of permitting the user to operate a job (for example, operation including deletion of the job and change of setting) to be executed in the job execution procedure (the job execution step) when authentication is successfully passed using authentication information which is input from the user.

In addition, the program includes a job execution stop command detection procedure (a job execution stop command detection step) of detecting a job execution stop command given by the user; and a first command accepting procedure (a first command accepting step) of accepting from the user an operation command for a job in the currently-executed state and a list display command to display a list of jobs in an execution standby state, without accepting an input of authentication information from the user and without passing the authentication conducted in the authentication procedure (the authentication step), when the job execution stop command is detected in the job execution stop command detection procedure (the job execution stop command detection step).

Further, the program includes a second command accepting procedure (a second command accepting step) of causing a display unit to display a list screen for displaying a list of jobs in the execution standby state and accepting from the user a selection of a job from the jobs displayed on the list screen and an operation command of deletion and change of setting of the selected job when the list display command to display the list of jobs in the execution standby state is accepted in the first command accepting procedure (the first command accepting step), and an authentication information accepting procedure (an authentication information accepting step) of accepting from the user the input of the authentication information when the operation command for the job in the currently-executed state is accepted in the first command accepting procedure (the first command accepting step), and also accepting from the user the input of the authentication information even when the operation command for the job in the execution standby state is accepted in the second command accepting procedure (the second command accepting step).

Furthermore, the program includes an operation execution procedure (an operation execution step) of, when, in response to the operation command for the job in the currently-executed state accepted in the first command accepting procedure (the first command accepting step), the authentication is successfully passed in the authentication procedure (the authentication step) using the authentication information accepted in the authentication information accepting procedure (the authentication information accepting step) and then the operation for the job in the currently-executed state is permitted, executing the operation for the job in the currently-executed state, and when, in response to the selection of the job and the operation command for the selected job accepted in the second command accepting procedure (the second command accepting step), the authentication is successfully passed in the authentication procedure (the authentication step) using the authentication information accepted in the authentication information accepting procedure (the authentication information accepting step) and then the operation for the selected job in the execution standby state is permitted, executing the operation for the selected job in the currently-executed state.

Furthermore, the program includes a procedure of, when the job execution stop command is detected in the job execution stop command detection procedure (the job execution stop command detection step), determining whether there is any job in the execution standby state; and a procedure of, when it is determined that there is a job in the execution standby state, enabling the first command accepting procedure (the first command accepting step), but when it is determined that there is no job in the execution standby state, disenabling the first command accepting procedure (the first command accepting step). When authentication is successfully passed in the authentication procedure (the authentication step) using the accepted authentication information to permit operation for the job in the currently-executed state, the operation for the job in the currently-executed state is executed.

The control unit 2 includes, as functional units achieved by causing the CPU to execute processing including the above procedures, an operation/display control unit 6, a job control unit 7, an authentication control unit 8, a communication control unit 9, and an image processing unit 10.

The operation/display control unit 6 controls an input of a command by the user and screen display with the operation display unit 3, sends a job execution stop request given by the user to the job control unit 7, sends authentication information given by the user to the authentication control unit 8, and sends an operation command for the job in the currently-executed state and operation command for a queued job selected from multiple queued jobs given by the user to the job control unit 7.

The operation/display control unit 6 displays a selection screen according to a command given by the user and various kinds of screens including a list screen.

More specifically, the operation/display control unit 6 serves as functions of a job execution stop command detection unit that detects a job execution stop command given by the user, and first a command accepting unit that accepts from the user an operation including deletion and change of setting of the job in the currently-executed state and a list display command to display the list of jobs in the execution standby state, without accepting an input of authentication information from the user and without passing the authentication with the authentication control unit 8, when the job execution stop command detection unit detects the job execution stop command.

Further, the operation/display control unit 6 serves as functions of the second command accepting unit that causes the operation display unit 3 to display a list screen for displaying a list of jobs in the execution standby state and accepts from the user a selection of a job from the jobs displayed on the list screen and an operation command for the selected job when the first command accepting unit accepts the list display command, and the authentication information accepting unit that accepts from the user the input of the authentication information when the first command accepting unit accepts the operation command for the job in the currently-executed state, and that also accepts from the user the input of the authentication information even when the second command accepting unit accepts the operation command for the job in the execution standby state.

The job control unit 7 uses the communication control unit 9 to manage control of facsimile transmission/reception of image data with another image processing apparatus or an information processing apparatus on a communication network or control of data communication via the Internet.

In addition, the job control unit 7 manages control of image reading using the scanner unit 11, control of printing of image data using the plotter unit 12, and control of copying using the scanner unit 11 and the plotter unit 12.

More specifically, the job control unit 7 serves as the function of a job execution unit that executes a job related to image processing including data communication, image reading, printing, or copying.

Further, the job control unit 7 accepts a command of a job stop request made by the user which is sent from the operation/display control unit 6, and stops the job in the currently-executed state and stops execution of the queued jobs.

In addition, when the job control unit 7 receives notification of permission of operation for a job from the authentication control unit 8, the job control unit 7 executes the operation of the job or the queued jobs commanded by the operation/display control unit 6, and after the execution, the job control unit 7 cancels the stop of execution of the jobs and resumes the execution.

Further, when the job control unit 7 receives a notification of prohibition of operation for a job from the authentication control unit 8, the job control unit 7 determines that the user's command is invalid, and cancels the stop of execution of the jobs and resumes the execution.

In addition, the job control unit 7 serves as functions of a determining unit that, when the job execution stop command detection unit detects the job execution stop command, determines whether there is any job in the execution standby state, ant that, when it is determined that there is a job in the execution standby state, enables the first command accepting unit, but when it is determined that there is no job in the execution standby state, disables the first command accepting unit. When the authentication unit successfully passes the authentication using the accepted authentication information to permit operation for the job in the currently-executed state, the operation execution unit is caused to execute the operation for the job in the currently-executed state.

The authentication control unit 8 determines whether the authentication succeeded or failed by collating the authentication information given by the user with the authentication information registered in the storage unit 4 in advance.

The authentication information is information given to the user having usage permission of the image processing apparatus 1, and includes, for example, a user ID and a password.

In addition, this image processing apparatus 1 has setting as to whether or not usage permission is given to each user for each of multiple types of functions including data communication function, image reading function, print function, and copying function together with the use of the image processing apparatus 1 for each user.

For example, usage permission of all of the above functions is given to the user A, whereas usage permission of only the print function is given to the user B.

This user ID is, for example, given to each user by the administrator of the image processing apparatus 1, and is identification information which is different for each user.

A password corresponding to the above user ID may be freely set by the user, or may be given to the user by the administrator.

Then, the storage unit 4 stores, in association with each other, the user ID and the password for each user and identification information representing a type of function of which usage permission is given to the user.

Regarding the storage format, when the user ID, the password, and the identification information representing the type of function of which usage permission is given may be stored in, for example, a table format, the authentication control unit 8 can easily look up the user ID, the password, and the identification information during process of authentication.

Then, for the usage of each function of the image processing apparatus 1, the authentication control unit 8 checks whether the user ID and the password given by the user match the user ID and the password of the storage unit 4, and when the function of which usage is requested by the user and the function executing the job of which deletion or change of setting is requested by the user are the same as the function indicated by the identification information representing the type of function of which usage permission corresponding to the user ID and the password of the storage unit 4 is given, the authentication control unit 8 determines that the authentication is successfully passed, and when they are different from the function indicated by the identification information, the authentication control unit 8 determines that the authentication has failed.

In addition, when the authentication is successfully passed, the authentication control unit 8 sends the job control unit 7 a notification indicating permission of deletion or change of the setting of the job (queued job) commanded by the user. When the authentication has failed, the authentication control unit sends the job control unit 7 a notification indicating prohibition.

In other words, the authentication control unit 8 serves as the function of the authentication unit that permits a user to operate the job to be executed by the job execution unit when the authentication using the authentication information given by the user is successfully passed.

The communication control unit 9 controls facsimile communication (FAX transmission, FAX reception) with an external device via a communication network including telephone circuit, network communication network, and the Internet and controls network communication and the Internet communication.

Further, the image processing unit 10 controls various kinds of image processing for the scanner unit 11 and the plotter unit 12.

Next, processes that are performed when the image processing apparatus 1 detects a command of a job execution stop from the user will be explained.

Figure 2:
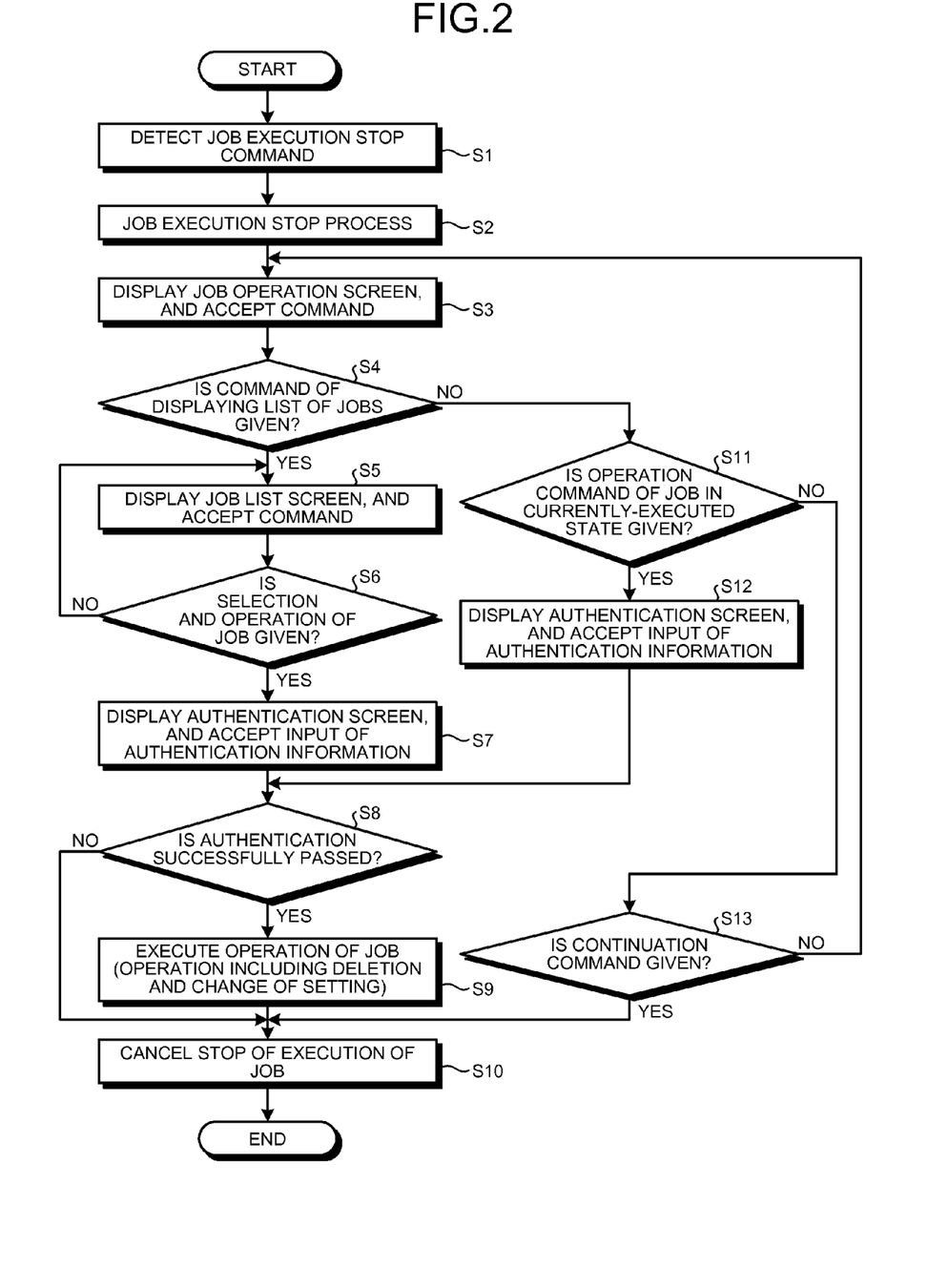
FIG. 2 is a flowchart illustrating processes performed when an image processing apparatus as illustrated in FIG. 1 detects a command of a job execution stop from a user.

FIG. 2 is a flowchart illustrating processes performed when the image processing apparatus 1 as illustrated in FIG. 1 detects a command of a job execution stop from the user.

The image processing apparatus 1 as illustrated in FIG. 1 executes job execution procedure (the job execution step) with the job control unit 7 of FIG. 1. The authentication procedure (authentication step) is executed with the authentication control unit 8 of FIG. 1.

In step S1, when the operation/display control unit 6 of FIG. 1 detects a job execution stop command from the user, the operation/display control unit 6 notifies the job control unit 7 of FIG. 1 of detection of the job execution stop command, and proceeds to step S2.

In step S1, the job execution stop command is detected when, for example, the user presses down a stop key provided on the operation display unit 3.

The step S1 corresponds to the job execution stop command detection procedure (the job execution stop command detection step).

In step S2, the job control unit 7 of FIG. 1 carries out the job execution stop process of stopping execution of the job in the currently-executed state and the queued jobs in the execution standby states, and proceeds to step S3.

In step S3, the operation/display control unit 6 of FIG. 1 displays a job operation screen on the operation display unit 3 of FIG. 1, and accepts an operation command for the job in the currently-executed state and a list display command to display a list of jobs in the execution standby state from the user without accepting an input of authentication information from the user and without passing the authentication, and proceeds to step S4.

The job operation screen displays a key for accepting an operation command for the job in the currently-executed state, a key for accepting a list display command to display a list of the job in the currently-executed state and the jobs in the execution standby state, and a key for accepting a command to cancel the stop of execution of the job and to continue the execution of the job.

Then, the operation/display control unit 6 of FIG. 1 accepts from the user, on the job operation screen, an operation command for the job in the currently-executed state, a list display command to display a list of the job in the currently-executed state and the jobs in the execution standby state, and a cancel command to cancel the stop of execution of the job and to continue the execution of the job.

This step S3 corresponds to the first command accepting procedure (the first command accepting step).

In step S4, the operation/display control unit 6 of FIG. 1 determines whether the user's command to display the list of jobs is given through the operation display unit 3 of FIG. 1. When the command to display the list of jobs is given (in a case of Y), step S5 is subsequently performed. When the command to display the list of jobs is not given (in a case of N), step S11 is subsequently performed.

In step S5, the operation/display control unit 6 of FIG. 1 displays a job list screen on the operation display unit 3 of FIG. 1, and causes the job in the currently-executed state and the jobs in the execution standby state to be displayed as a list in the list screen. The operation/display control unit 6 of FIG. 1 accepts from the user a selection of a job from the jobs displayed on the job list screen and an operation command for the selected job, and proceeds to step S6.

On the list screen, the job in the currently-executed state and the queued jobs in the execution standby state are displayed as list, and an operation target job is selected from among the jobs displayed as the list. The list screen displays a key for accepting an operation command for the selected job and a key for accepting a command to cancel the stop of execution of the job and to continue the execution of the job.

This step S5 corresponds to the second command accepting procedure (the second command accepting step).

In step S6, the operation/display control unit 6 of FIG. 1 determines whether the user's selection of a job and operation command for the selected job are given through the operation display unit 3 of FIG. 1. When the selection of a job and the operation command for the job are given (in a case of Y), step S7 is subsequently performed. When the command selection and the operation command for the job are not given (in a case of N), step S5 is performed again, so that the job list screen is continuously displayed.

In step S6, the operation/display control unit 6 of FIG. 1 notifies the job control unit 7 of the selection of a job and the operation command for the selected job given by the user.

In step S7, the operation/display control unit 6 of FIG. 1 displays an authentication screen on the operation display unit 3 of FIG. 1, and accepts an input of the user ID and the password given by the user with the operation display unit 3 of FIG. 1, and proceeds to step S8.

The authentication screen is a screen for prompting the user to input the user ID and the password of the user.

This step S7 corresponds to the authentication information accepting procedure (the authentication information accepting step).

Then, when the authentication control unit 8 of FIG. 1 receives the user ID and the password, accepted in step S7, from the operation/display control unit 6 of FIG. 1, authentication is performed using the authentication information registered in the storage unit 4 of FIG. 1.

In step S8, the authentication control unit 8 of FIG. 1 determines whether the authentication has been successfully passed or not. When the authentication has been successfully passed (in a case of Y), step S9 is subsequently performed. When the authentication has not been successfully passed, i.e., the authentication has failed (in a case of N), step S10 is subsequently performed.

In step S8, the authentication control unit 8 of FIG. 1 notifies the job control unit 7 of FIG. 1 that the authentication has been successfully passed or the authentication has failed.

In the determination made in step S8, when the user who has given the operation command for the job selected from among the job in the currently-executed state and the jobs in the execution standby state has usage permission of the function of executing the selected job, the authentication is determined to have been successfully passed. When the user who has given the operation command for the job selected from among the job in the currently-executed state and the jobs in the execution standby state does not have usage permission of the function of executing the selected job, the authentication is determined to have failed.

In step S9, the job control unit 7 of FIG. 1 receives the notification of successful authentication from the authentication control unit 8 of FIG. 1, and executes operation for the job selected by the user notified from the operation/display control unit 6 of FIG. 1, and proceeds to step S10.

In step S10, the job control unit 7 of FIG. 1 cancels the stop of execution of the job, and resumes execution of the job that was stopped, and terminates this process.

In step S10, when the job in the currently-executed state is deleted, the job control unit 7 of FIG. 1 executes one of the queued jobs that is to be subsequently executed. When a queued job is deleted, the job control unit 7 of FIG. 1 executes the job that was stopped. When the setting of the job in the currently-executed state is changed, the job is executed again in accordance with the changed setting.

On the other hand, in step S11, the operation/display control unit 6 of FIG. 1 determines whether the user's operation command for the job in the currently-executed state is given through the operation display unit 3 of FIG. 1. When the user's operation command for the job in the currently-executed state is given (in a case of Y), step S12 is subsequently performed. When the operation command for the job in the currently-executed state is not given by the user (in a case of N), step S13 is subsequently performed.

In step S12, the operation/display control unit 6 of FIG. 1 displays an authentication screen on the operation display unit 3 of FIG. 1, accepts an operation command for the job in the currently-executed state, and proceeds to step S8.

This step S12 also corresponds to the authentication information accepting procedure (the authentication information accepting step).

In this case, in the determination made in step S8, when the user who has given the operation command for the job in the currently-executed state has usage permission of the function of executing the selected job, the authentication is determined to have been successfully passed. When the user who has given the operation command for the job in the currently-executed state does not have usage permission of the function of executing the selected job, the authentication is determined to have failed.

In step S13, the operation/display control unit 6 of FIG. 1 determines whether a continuation command to cancel the stop of execution of the job and to continue the execution of the job is given through the operation display unit 3 of FIG. 1. When the continuation command is given (in a case of Y), step S10 is subsequently performed, so that the operation/display control unit 6 cancels the stop of execution of the job. When the continuation command is not given (in a case of N), step S3 is performed again, so that the operation/display control unit 6 causes the job operation screen to be displayed continuously.

The above steps S8 to S10 correspond to the operation execution procedure (the operation execution step).

As described above, when the authentication is successfully passed, and permission is given to deletion or change of setting of a job, but there are not only a job in the currently-executed state but also a job in the execution standby state, the job in the execution standby state can be deleted and the setting of the job in the execution standby state can be changed without passing authentication of the job in the currently-executed state.

In addition to the above-described processes, the following control process may be added.

The job control unit 7 of FIG. 1 receives a notification of the job execution stop command from the operation/display control unit 6, the job control unit 7 executes the process of step S2, and thereafter, executes a step of determining whether there is any job in the execution standby state.

This determination process may be made by determining whether there is any the job in the execution standby state by directly looking up the storage unit 4, or be made by looking up table data of the jobs in the execution standby state list managed by the job control unit 7 (the table data are stored to, for example, a RAM, not illustrated).

Then, when the job control unit 7 of FIG. 1 determines that there is a job in the execution standby state, the job control unit 7 executes a step of enabling the process of the above first command accepting procedure (the first command accepting step) of the operation/display control unit 6, and the process proceeds to the step S3. Thereafter, the flow of the processes described above is executed.

On the other hand, when the job control unit 7 of FIG. 1 determines that there is no job in the execution standby state, the job control unit 7 executes a step of disabling the process of the first command accepting procedure (the first command accepting step) of the operation/display control unit 6.

When the process of the first command accepting procedure is disabled, the operation/display control unit 6 executes a step of displaying an authentication screen on the operation display unit 3 of FIG. 1, receiving an input of the user ID and the password of the user through the operation display unit 3 of FIG. 1, and receiving an input of authentication information for authentication of the function which is currently being executed.

Further, the authentication control unit 8 of FIG. 1 executes a step of determining whether the authentication has been successfully passed or not, and notifies the operation/display control unit 6 of FIG. 1 that the authentication has been successfully passed or that the authentication has failed.

Then, when the operation/display control unit 6 of FIG. 1 receives the notification indicating that the authentication has been successfully passed from the authentication control unit 8 of FIG. 1, the operation/display control unit 6 displays a job operation screen for enabling operation for the job in the currently-executed state on the operation display unit 3. When the operation/display control unit 6 receives the notification indicating that the authentication has not been successfully passed, the operation/display control unit 6 displays a notification screen indicating the failed authentication.

The notification of the failed authentication is also notified to the job control unit 7 of FIG. 1. When a job in the currently-executed state is deleted, the job control unit 7 of FIG. 1 cancels the stop of execution of the job and resumes the execution of the job that was stopped, and terminates this process.

The operation/display control unit 6 of FIG. 1 also determines, on the display of the job operation screen, whether an operation command for the job in the currently-executed state is given through the operation display unit 3 of FIG. 1. When the operation command is given, the operation/display control unit 6 notifies the job control unit 7 of FIG. 1 of execution of the operation, and the job control unit 7 of FIG. 1 executes operation for the job in the currently-executed state.

As described above, when there is no job in the execution standby state, and there is only a job in the currently-executed state, authentication is immediately requested. Therefore, the user can reach the job operation screen in a short time, which improves the user's operability.

Subsequently, a screen display example where a job execution stop command is given in the image processing apparatus 1 will be explained.

Figure 3:
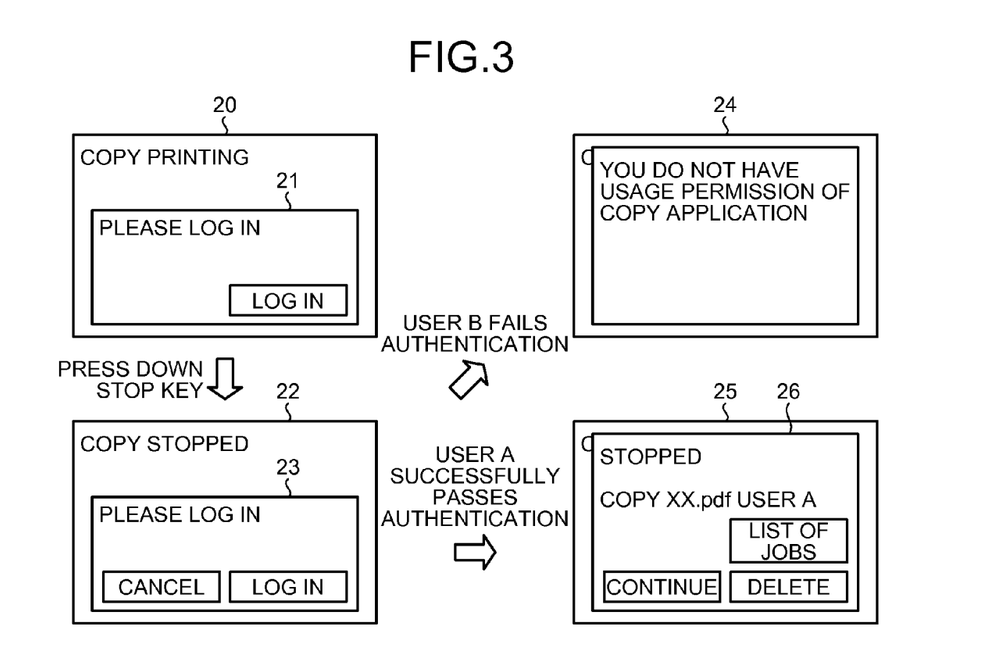
FIG. 3 is a figure illustrating examples of a screen display which may considered when a job execution stop command is given in the image processing apparatus.
Figure 4:
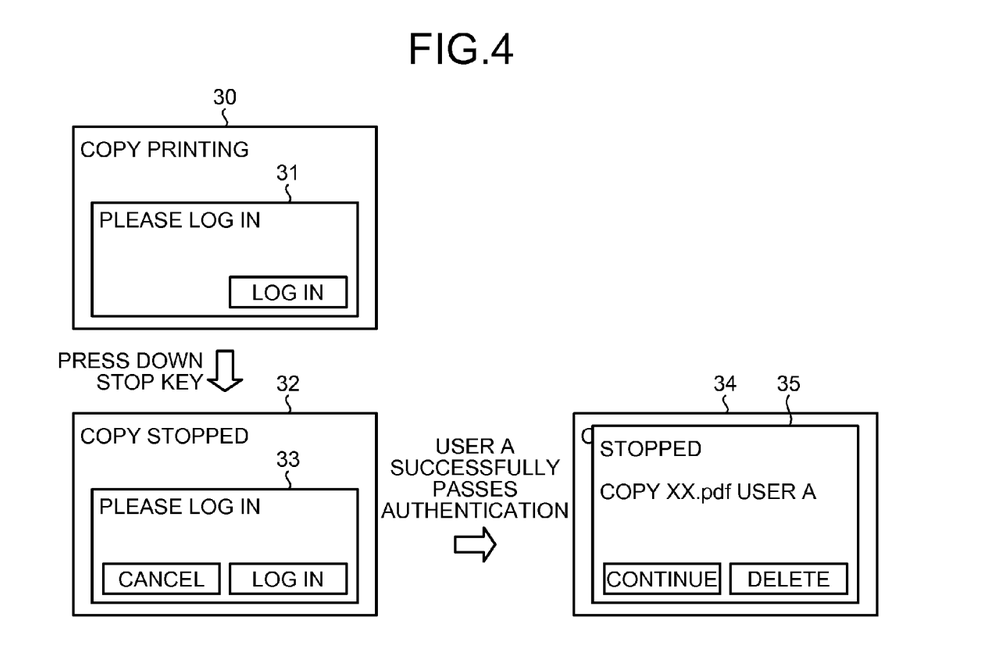
FIG. 4 is a figure illustrating examples of a screen display which may considered when a job execution stop command is likewise given in the image processing apparatus.

FIGS. 3 and 4 are figures illustrating examples of a screen display which may considered when the job execution stop command is given in the image processing apparatus 1.

Figure 5:
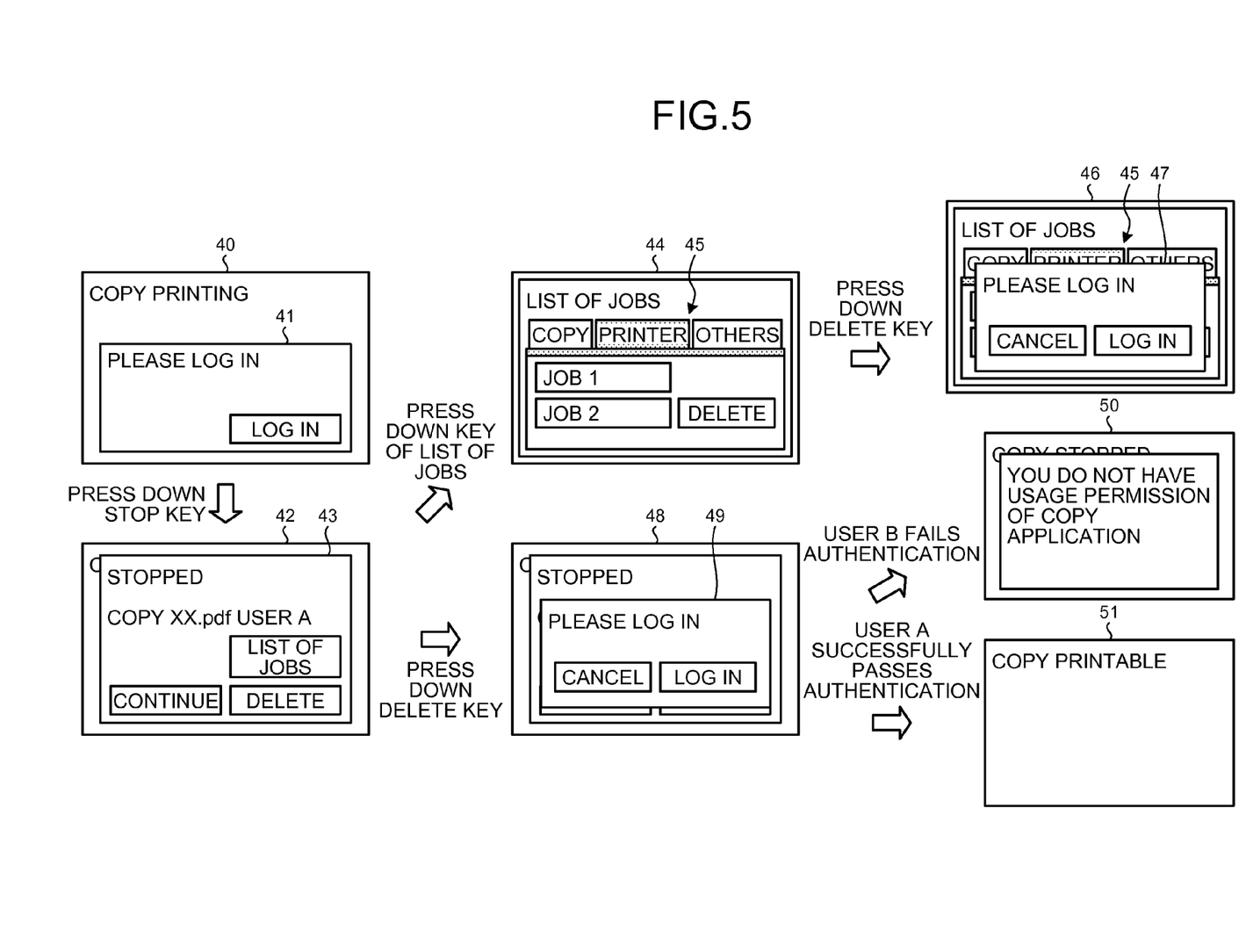
FIG. 5 is a figure illustrating examples of a screen display when a job execution stop command is given in the image processing apparatus as illustrated in FIG. 1.
Figure 6:
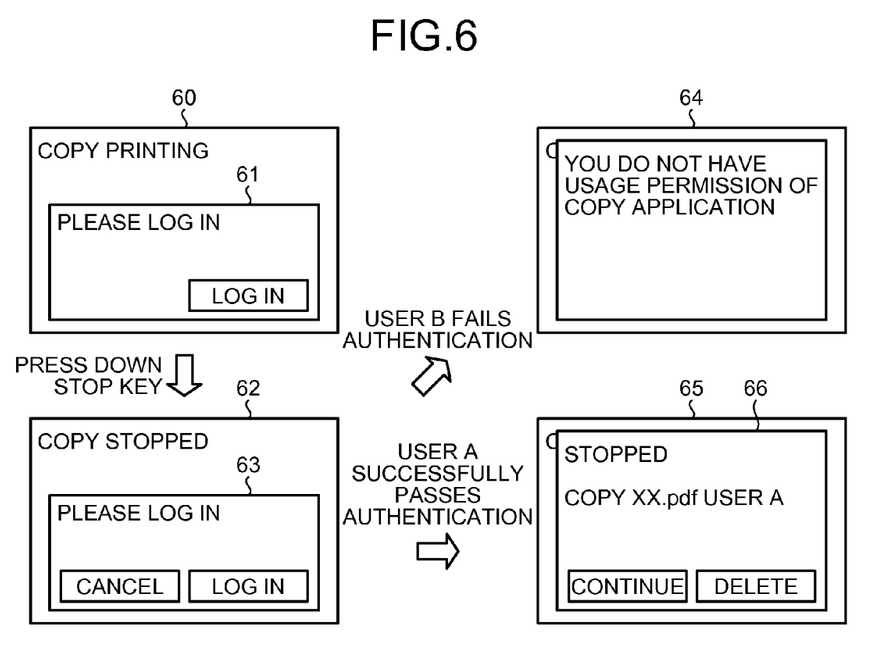
FIG. 6 is a figure illustrating examples of a screen display when a job execution stop command is likewise given in the image processing apparatus as illustrated in FIG. 1.

FIGS. 5 and 6 are figures illustrating examples of a screen display when a job execution stop command is given in the image processing apparatus 1 as illustrated in FIG. 1.

First, examples of screen display which may considered when a job execution stop command is given in the image processing apparatus will be explained with reference to FIGS. 3 and 4.

In this explanation, the user A has usage permission of copy and print functions of the image processing apparatus, whereas the user B has only usage permission of print function of the image processing apparatus.

When the user A executes copy and print with the image processing apparatus, a display screen 20 of FIG. 3 is displayed during the execution. This display screen 20 displays a message indicating that copy and print are executed, and displays a login screen 21 to prompt the user to display the authentication screen.

It should be noted that this login screen 21 is displayed in the display screen 20 only when the user has not logged in to the image forming apparatus.

More specifically, the state in which the display screen 20 including the login screen 21 of FIG. 3 is displayed points to a state in which once the user A logs in to the image forming apparatus and then starts execution of print function, and thereafter logs out (this is applicable to a display screen 30 of FIG. 4, a display screen 40 of FIG. 5, and a display screen 50 of FIG. 6, explained later).

Hereinafter explained is a case where, while the display screen 20 of FIG. 3 is displayed, the user B transits a printing job to the image processing apparatus from a PC that the user B operates so that the printing job is registered as a queued job, and thereafter, in order to delete the queued job, the user B walks up to the image processing apparatus, and while the display screen 20 of FIG. 3 is displayed, a stop key (not illustrated) of a job execution stop command is pressed down.

When the image processing apparatus stops execution of the job, and thereafter a display screen 22 displays a login screen 23 to prompt the user to display the authentication screen, the image processing apparatus determines whether the user has usage permission of copy and print functions of executing the job of which execution is being stopped, on the authentication screen called in the login screen 23. When, in the authentication screen, the user A inputs the user ID and the password, the authentication is successfully passed. Accordingly, the image processing apparatus displays a display screen 25 to display a job operation screen 26 in which a operation command to delete a job in copy and print state, a list display command to display of a job list, and a command to continue the execution of the job can be input.

On the other hand, when the user B inputs the user ID and the password in the authentication screen called in the login screen 23, user B does not have usage permission of the copy and print functions displayed on the display screen 22, and therefore, the authentication fails. Accordingly, a message indicating that the user B does not have usage permission is displayed as shown in a display screen 24, and the job which was stopped is resumed. Therefore, in order for the user B to delete the queued job registered to the image processing apparatus from the PC, the user B can do nothing until the queued job is started, and paper is wasted.

A display screen 30 of FIG. 4 is a screen that is displayed when the user A executes copy and print with the image processing apparatus. When there is no queued job except this job, the image processing apparatus determines whether the user A has usage permission of copy and print functions executing the job of which executing is stopped, on the authentication screen called in a login screen 31. When, in the authentication screen, the user A inputs the user ID and the password, the authentication is successfully passed. Accordingly, the image processing apparatus displays a display screen 34, and the image processing apparatus displays a job operation screen 35 in which a command to delete a job in copy and print state and a command to continue the job execution can be input.

Subsequently, examples of a screen display where a job execution stop command is given in the image processing apparatus 1 according to this embodiment will be explained.

The transition of the screen as illustrated in FIG. 5 is executed in the processes as illustrated in the flowchart of FIG. 2.

In the transition of the screen as illustrated in FIG. 5, determination processing for determining whether there is any job in the execution standby state is added to the processes as illustrated in the flowchart of FIG. 2, and this is executed even in process example where it is determined that there is a job in the execution standby state in the determination process.

In this explanation, the user A has usage permission of the copy and print functions of the image processing apparatus, whereas the user B has only usage permission of the print function of the image processing apparatus.

When the user A executes copy and print with the image processing apparatus, a display screen 40 of FIG. 5 is displayed during the execution. This display screen 40 displays a message indicating that copy and print are executed, and displays a login screen 41 to prompt the user to display the authentication screen.

Hereinafter explained is a case where, while the display screen 40 of FIG. 5 is displayed, the user B transits a printing job to the image processing apparatus 1 from a PC that the user B operates so that the printing job is registered as a queued job to the image processing apparatus 1, and thereafter, in order to delete the queued job, the user B walks up to the image processing apparatus 1, and while the display screen 40 of FIG. 5 is displayed, a stop key (not illustrated) for a job execution stop command is pressed down.

After the image processing apparatus 1 stops execution of the job in the currently-executed state and the queued job, a display screen 42 is displayed on the operation display unit 3 of FIG. 1. On the display screen 42, a job operation screen 43 is displayed.

This job operation screen 43 displays a deletion key for accepting a command to delete the job in the currently-executed state, a job list key for accepting a command to display a list display for displaying the job in the currently-executed state and the jobs in the execution standby state, and a continuation key for accepting a command to cancel the stop of execution of the job and to continue the execution of the job.

When the user B presses down a job list key of the job operation screen 43, the image processing apparatus 1 displays a job list screen 45 on a display screen 44.

On this job list screen 45, the job in the currently-executed state and the jobs in the execution standby state are displayed as a list, and a job is selected from the user from among the jobs displayed as the list. A job list screen 45 displays a deletion key for accepting a command to delete the selected job.

When, on the job list screen 45, the user B presses down a button of queued job queued by the user B (in the figure "JOB2") and presses down a deletion key, the image processing apparatus 1 displays a login screen 47 in a display screen 46.

In this case, when the user B inputs the user ID and the password in the authentication screen called on the login screen 47, a determination is made as to whether the user B has usage permission of print function for executing the queued job reserved by the user B, and the user B successfully passes the authentication, so that the user B can delete the queued job reserved by the user B before the queued job is executed.

In this manner, when there are not only a job in the currently-executed state and but also jobs in the execution standby state, a job in the execution standby state can be deleted without passing the authentication of the job in the currently-executed state.

When the user A presses down the deletion key on the job operation screen 43 of the display screen 42, the image processing apparatus determines whether the user A has usage permission of copy and print functions of executing the job of which execution is being stopped, on the authentication screen called on a login screen 29 of a display screen 48. When the user A inputs the user ID and the password in the authentication screen, the authentication is successfully passed. Accordingly, the job of the copy and print which are being executed is deleted, and a display screen 51 is displayed to show a message indicating that the image processing apparatus is ready to do new copy and print, and then, the image processing apparatus goes into process standby state.

On the other hand, when the user B presses down the deletion key on the job operation screen 43 of the display screen 42, the image processing apparatus determines whether the user B has usage permission of copy and print functions of executing the job of which execution is being stopped, on the authentication screen called on the login screen 29 of a display screen 48. Even when the user B inputs the user ID and the password in the authentication screen, the authentication fails. Accordingly, the display screen 50 is displayed to show a message indicating that the user B does not have usage permission of copy and print functions, and the job which was stopped is resumed.

In this way, the image processing apparatus can prohibit a user from operating another user's job executed by a function of which usage permission is not given to the user.

In the transition of the screen as illustrated in FIG. 6, determination process of determining whether there is any job in the execution standby state is added to the processes illustrated in the flowchart of FIG. 2, and this is executed in a process example where it is determined that there is no job in the execution standby state in the determination process.

In this explanation, the user A has usage permission of the copy and print functions of the image processing apparatus, whereas the user B has only usage permission of the print function of the image processing apparatus.

In this case, only the copy and print by the user A is executed, and there is no other queued job exists.

When the user A executes copy and print with the image processing apparatus, a display screen 60 of FIG. 6 is displayed during the execution. This display screen 60 displays a message indicating that copy and print is executed, and displays a login screen 61 to prompt the user to display the authentication screen.

A case where the user presses down a stop key (not illustrated) for a job execution stop command while the display screen 60 of FIG. 6 is displayed will be explained.

When the image processing apparatus 1 stops the execution of a job, and thereafter a display screen 62 displays a login screen 63 to prompt the user to display the authentication screen, the image processing apparatus 1 determines whether the user A has usage permission of copy and print functions of executing the job of which execution is being stopped, on the authentication screen called on the login screen 63. When, on the authentication screen, the user A inputs the user ID and the password, the authentication is successfully passed. Accordingly, the image processing apparatus displays a display screen 65 to display a job operation screen 66 in which a command to delete a job in copy and print state and to continue the execution of the job can be input.

On the other hand, when the user B inputs the user ID and the password in the authentication screen called on the login screen 63, user B does not have usage permission of the copy and print functions displayed on the display screen 62, and therefore, the authentication fails. Accordingly, a message indicating that the user B does not have usage permission is displayed as shown in a display screen 64, and the job which was stopped is resumed. Therefore, in order for the user B cannot delete the job of the user A executed by the copy and print functions of which the usage permission is not given to the user B.

According to the processes described above, while a job is executed, the user who does not have usage permission of a function of executing the job can perform operation, without passing the authentication of this function, to delete a queued job executed by a function of which usage permission is given to the user.

Regarding the display of the authentication screen, which authentication screen is displayed first may be determined on the basis of the number of subsequent operations made by the user.

Alternatively, which authentication screen is displayed first may also be determined on the basis of the number of subsequent operations made by the user and on the basis of whether an operation that can be performed in a screen displayed subsequently allows only operation of a job.

Further, in the processes described above, only deletion of a job has been explained. However, change of setting of a job may also be carried out in the same manner as what has been explained above.

When the image processing apparatus 1 according to this embodiment detects that a stop key is pressed down by the user while, during job execution, a screen of the job is displayed, the image processing apparatus 1 stops execution of the job in the currently-executed state and the queued jobs.

Thereafter, a selection screen is displayed which allows a command to delete the job in the currently-executed state and which allows a command to display a list of the job in the currently-executed state and the queued jobs.

Further, when the user instructs the display of a list of jobs through the selection screen, a list screen is displayed to show the job in the currently-executed state and the queued jobs as a list, allow the user to select a job from the jobs displayed on the list screen, and allow a user to delete the selected job.

Then, when the user selects a job on the list screen and instructs deletion of the selected job, the authentication screen is displayed. When authentication is successfully passed using authentication information which is input by the user on the authentication screen, deletion of the job selected in the list screen is executed.

Therefore, when the authentication is successfully passed, and permission is given to deletion or change of setting of a job, but there are not only a job in the currently-executed state but also a job in the execution standby state, the job in the execution standby state can be deleted and the setting of the job in the execution standby state can be changed without passing authentication of the job in the currently-executed state.

According to the present invention, when a user successfully passed authentication and is allowed to operate jobs but there are not only a job in the currently-executed state but also a job in an execution standby state, the user can operate the job in the execution standby state without passing authentication of the job in the currently-executed state.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a job execution unit that executes a job related to image processing;
   an authentication unit that, when authentication using authentication information which is input by a user is successfully passed, permits a user to operate a job to be executed by the job execution unit;
   a job execution stop command detection unit that detects a job execution stop command given by the user;
   a first command accepting unit that, when the job execution stop command detection unit detects the job execution stop command, accepts from the user an operation command for a job in the currently-executed state and a list display command to display a list of jobs in the execution standby state, without accepting an input of authentication information from the user and without passing the authentication conducted by the authentication unit;
   a second command accepting unit that, when the first command accepting unit accepts the list display command, causes a display unit to display a list screen in which the jobs in the execution standby state are displayed as a list, and accepts from the user a selection of a job from the jobs displayed on the list screen and an operation command for the selected job;
   an authentication information accepting unit that, when the first command accepting unit accepts the operation command for the job in the currently-executed state, accepts from the user the input of the authentication information, and that, even when the second command accepting unit accepts the operation command for the job in the execution standby state, also accepts from the user the input of the authentication information; and
   an operation execution unit that,
   when, in response to the operation command for the job in the currently-executed state accepted by the first command accepting unit, the authentication unit successfully passes the authentication using the authentication information accepted by the authentication information accepting unit and then the authentication unit permits operation for the job in the currently-executed state, executes the operation for the job in the currently-executed state, and
   when, in response to the selection of the job and the operation command for the selected job accepted by the second command accepting unit, the authentication unit successfully passes the authentication using the authentication information accepted by the authentication information accepting unit and then the authentication unit permits operation for the selected job in the execution standby state, executes the operation for the selected job in the currently-executed state.

2. The image processing apparatus according to claim 1, further comprising:
   a determining unit that, when the job execution stop command detection unit detects the job execution stop command, determines whether there is any job in the execution standby state; and
   a control unit that, when the determining unit determines that there is a job in the execution standby state, enables the first command accepting unit, but when the determining unit determines that there is no job in the execution standby state, disables the first command accepting unit, wherein
   when the authentication unit successfully passes the authentication using the authentication information accepted by the authentication information accepting unit and then the authentication unit permits operation for the job in the currently-executed state, the control unit causes the operation execution unit to execute the operation for the job in the currently-executed state.

3. A processing method for an image processing apparatus, the method comprising:
   a job execution step of executing a job related to image processing;
   an authentication step of permitting, when authentication using authentication information which is input by a user is successfully passed, a user to operate a job to be executed in the job execution step;
   a job execution stop command detection step of detecting a job execution stop command given by the user;
   a first command accepting step of, when the job execution stop command is detected in the job execution stop command detection step, accepting from the user an operation command for a job in the currently-executed state and a list display command to display a list of jobs in the execution standby state, without accepting an input of authentication information from the user and without passing the authentication conducted in the authentication step;

a second command accepting step of, when the list display command is accepted in the first accepting step, causing a display unit to display a list screen in which the jobs in the execution standby state are displayed as a list and accepting from the user a selection of a job from the jobs displayed on the list screen and an operation command for the selected job;

an authentication information accepting step of, when the operation command for the job in the currently-executed state is accepted in the first command accepting step, accepting from the user the input of the authentication information, and of, even when the operation command for the job in the execution standby state is accepted in the second command accepting step, also accepting from the user the input of the authentication information; and an operation execution step of, when, in response to the operation command for the job in the currently-executed state accepted in the first command accepting step, the authentication is successfully passed in the authentication step using the authentication information accepted in the authentication information accepting step and then operation for the job in the currently-executed state is permitted, executing the operation for the job in the currently-executed state, and when, in response to the selection of the job and the operation command for the selected job accepted in the second command accepting step, the authentication is successfully passed in the authentication step using the authentication information accepted in the authentication information accepting step and then the operation for the selected job in the execution standby state is permitted, executing the operation for the selected job in the currently-executed state.

4. The processing method according to claim 3, further comprising:

a determining step of, when the job execution stop command is detected in the job execution stop command detection step, determining whether there is any job in the execution standby state; and a controlling step of, when it is determined in the determining step that there is a job in the execution standby state, enabling the first command accepting step, but when it is determined that there is no job in the execution standby state, disabling the first command accepting step, wherein when the authentication is successfully passed using the accepted authentication information in the authentication step and then the operation for the job in the currently-executed state is permitted, the operation for the job in the currently-executed state is executed in the operation execution step.

5. A computer program product comprising a non-transitory computer-readable medium including programmed instructions, wherein the instructions cause a computer, which controls an image processing apparatus, to execute:

a job execution procedure of executing a job related to image processing;

an authentication procedure of permitting, when authentication using authentication information which is input by a user is successfully passed, a user to operate a job to be executed in the job execution procedure;

a job execution stop command detection procedure of detecting a job execution stop command given by the user;

a first command receiving procedure of, when the job execution stop command is detected in the job execution stop command detection procedure, accepting from the user an operation command for a job in the currently-executed state and a list display command to display a list of jobs in the execution standby state, without accepting an input of authentication information from the user and without passing the authentication conducted in the authentication procedure;

a second command accepting procedure of, when the list display command is accepted in the first accepting procedure, causing a display unit to display a list screen in which the jobs in the execution standby state are displayed as a list and accepting from the user a selection of a job from the jobs displayed on the list screen and an operation command for the selected job;

an authentication information accepting procedure of, when the operation command for the job in the currently-executed state is accepted in the first command accepting procedure, accepting from the user the input of the authentication information, and of, even when the operation command for the job in the execution standby state is accepted in the second command accepting procedure, also accepting from the user the input of the authentication information; and an operation execution procedure of, when, in response to the operation command for the job in the currently-executed state accepted in the first command accepting procedure, the authentication is successfully passed in the authentication procedure using the authentication information accepted in the authentication information accepting procedure and then operation for the job in the currently-executed state is permitted, executing the operation for the job in the currently-executed state, and when, in response to the selection of the job and the operation command for the selected job accepted in the second command accepting procedure, the authentication is successfully passed in the authentication procedure using the authentication information accepted in the authentication information accepting procedure and then the operation for the selected job in the execution standby state is permitted, executing the operation for the selected job in the currently-executed state.

6. The computer program product according to claim 5, further comprising:

a determining procedure of, when the job execution stop command is detected in the job execution stop command detection procedure, determining whether there is any job in the execution standby state; and a controlling procedure of, when it is determined in the determining procedure that there is a job in the execution standby state, enabling the first command accepting procedure, but when it is determined that there is no job in the execution standby state, disabling the first command accepting procedure, wherein when the authentication is successfully passed using the received authentication information in the authentication procedure and then the operation of the job in the currently-executed state is permitted, the operation for the job in the currently-executed state is executed in the operation execution procedure.

* * * * *